No. 872,841. PATENTED DEC. 3, 1907.
A. A. NORTH.
DRILL CHUCK.
APPLICATION FILED MAY 12, 1905.
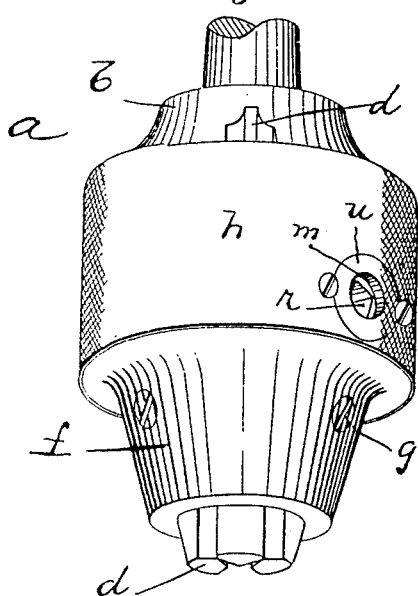
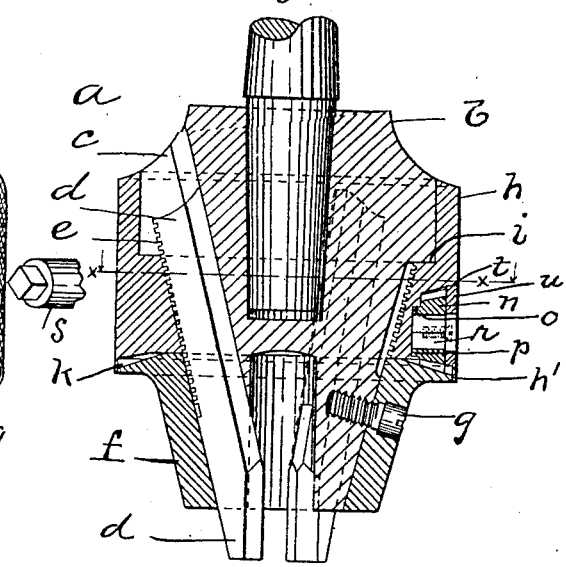
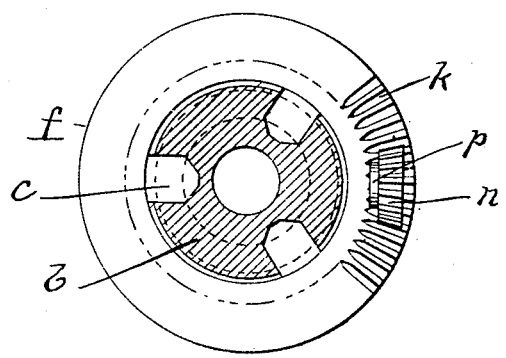
Witnesses:
F. H. Elliott
Inventor.
Albert A. North

UNITED STATES PATENT OFFICE.

ALBERT A. NORTH, OF NEW BRITAIN, CONNECTICUT, ASSIGNOR TO THE SKINNER CHUCK COMPANY, OF NEW BRITAIN, CONNECTICUT, A CORPORATION OF CONNECTICUT.

DRILL-CHUCK.

No. 872,841.　　　　Specification of Letters-Patent.　　　　Patented Dec. 3, 1907.

Application filed May 12, 1905. Serial No. 260,067.

*To all whom it may concern:*

Be it known that I, ALBERT A. NORTH, citizen of the United States of America, residing at New Britain, in the county of Hartford and State of Connecticut, have invented certain new and useful Improvements in Drill-Chucks, of which the following is a specification.

The invention relates particularly to drill chucks in which the jaw operating nut is gear operated and the object of the invention is to provide a device of the character described in which both gears are carried by the chuck continually in mesh, and further, in housing the gears within the chuck, thus removing any possibility of injury to the hands of the workmen by getting caught, giving the chuck a more pleasing appearance, and preventing clogging of the gears by dirt or injury to them.

In the drawings Figure 1 is a perspective view of an assembled chuck in which my invention is embodied. Fig. 2 is a longitudinal section showing the beveled gear on the body with the beveled pinion in mesh. Fig. 3 is a sectional view on the line $x$—$x$ of Fig. 2, looking in the direction of the arrows.

The chuck illustrated in the drawings is indicated as having a body $a$ made up of two parts, one of which $b$ has suitable converging grooves $c$ in which are located the jaws $d$ which have threads $e$ cut in their exterior surfaces, beginning at the back end and extending towards the front end, and the cap $f$ which fits over the forward end of the part $b$ and is secured thereto as by the screws $g$. This cap forms the outer walls of the grooves $c$ and with the shoulder $i$ forms a circumferential groove about the body in which the jaw operating nut $h$, which is interiorly threaded to engage the threads on the jaws, lies. It will be readily seen that the rotation of the nut will move the jaws in and out of the body. The nut illustrated in the drawings is a solid annular ring having a knurled outer surface to provide a hand grip. It is clear, however, that it is not essential that the nut shall be a solid annular ring nor that the hand grip shall be formed directly on the nut, as the nut can be well made in two parts held in place by a sleeve, the outer surface of which is knurled to form the hand grip.

In a surface of the body which butts against the nut (in the embodiment of the invention shown this surface is the shoulder formed by the back edge of the cap $f$) I cut a beveled gear $k$. In a recess $m$ in the nut I locate a beveled pinion $n$ whose teeth project from that face of the nut which butts against the beveled gear on the body. At the bottom of the recess $m$ a depression $o$ is formed to receive a hub $p$ on the pinion by which it is centered. The pinion is centrally pierced by an opening $r$ irregular in shape, to which a key $s$ may be applied for the purpose of rotating the pinion.

For convenience in assembling the shell of the nut is cut away as at $t$ in order to position the pinion $n$, and a cap $u$ covers over the recess except as it is provided with an opening through which the key may be passed. The flange $h'$ extends from the nut to cover the gear on the cap and so protects the meshing point of the gears.

It will thus be seen that by having the intermeshing gears cut in or projecting from abutting faces of the body and the nut they are entirely inclosed and out of sight. The gears are always in place ready for operation and it is only necessary to apply the key to operate the parts.

In use these chucks are customarily turned up and tightened onto a tool shank by hand and then the final pinch of the jaws is given by the gears. If the gears by which the chuck is operated are exposed there is always the possibility that the workman will run his finger in between the gears and cause a serious injury; in actual practice this often happens and constitutes a decided objection to the present gear operated chucks.

In the use of my improved chuck there is no possibility of the workman doing himself any injury because of getting caught in the gears.

Other advantages of inclosing the gears are that they are protected from dirt and chips which would tend to clog them, and the teeth are also protected from breakage and consequently the life of the chuck is materially lengthened.

As will be noted the gear operating mechanism of my chuck is always in mesh and ready for use and requires merely the application of a key, this being a decided advantage over those chucks wherein the operating pinion is removable from the chuck, in which case if the key is lost the chuck is thrown out of commission until a new key is provided.

In my device any piece which is roughly shaped to fit the hole in the pinion will serve as a key to operate the parts.

The term body as used in the claims I have used to indicate the complete body including the part $b$ and the cap which is fixedly secured to the part $b$.

I claim as my invention:

1. In a chuck body, threaded jaws slidable in the body, an annular nut concentric with the body and having threaded engagement with the jaws, the perimeter of the nut being exposed and adapted to be actuated by hand, and rack and pinion mechanism beneath the surface of the body and the nut, adapted to be actuated by a key, substantially as described.

2. In a chuck the body having an annular groove forming shoulders, a beveled gear cut in one of said shoulders, a jaw operating nut rotarily mounted in the annular groove in said body, a beveled pinion rotarily mounted in a recess in said nut and meshing with said gear, and the jaws operatively connected with said nut.

3. In a chuck the body having an annular groove forming shoulders, a beveled gear cut in one of said shoulders, a jaw operating nut rotarily mounted in the annular groove in said body, a beveled pinion rotarily mounted in a recess in said nut and meshing with said gear, a flange on said nut inclosing the gear on the body, and the jaws having operative connection with said nut.

In testimony whereof I affix my signature in presence of two witnesses.

ALBERT A. NORTH.

Witnesses:
  BENJ. F. DAMON,
  EDWARD J. SKINNER.